(12) United States Patent  (10) Patent No.: US 8,140,444 B2
Bronstad et al.  (45) Date of Patent: *Mar. 20, 2012

(54) METHOD OF MEASURING A LARGE POPULATION OF WEB PAGES FOR COMPLIANCE TO CONTENT STANDARDS THAT REQUIRE HUMAN JUDGEMENT TO EVALUATE

(75) Inventors: P. Matthew Bronstad, Medford, MA (US); Matthew C. King, Colorado Springs, CO (US); James Thatcher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

This patent is subject to a terminal disclaimer.

(21) Appl. No.: 12/060,943

(22) Filed: Apr. 2, 2008

(65) Prior Publication Data

US 2008/0208561 A1 Aug. 28, 2008

Related U.S. Application Data

(63) Continuation of application No. 11/362,988, filed on Feb. 27, 2006, now Pat. No. 7,725,407.

(51) Int. Cl.
*G06F 15/18* (2006.01)
(52) U.S. Cl. .................. 706/1; 706/48; 715/234
(58) Field of Classification Search ................. 706/1, 48; 715/234
See application file for complete search history.

(56) References Cited

U.S. PATENT DOCUMENTS

| 6,334,131 | B2 | 12/2001 | Chakrabarti et al. |
| 6,417,873 | B1 | 7/2002 | Fletcher et al. |
| 6,643,641 | B1 | 11/2003 | Snyder |
| 6,895,551 | B1 | 5/2005 | Huang et al. |
| 6,983,280 | B2 | 1/2006 | Cheung et al. |
| 7,213,198 | B1 | 5/2007 | Harik |
| 2004/0148568 | A1 | 7/2004 | Springer |
| 2005/0251536 | A1 | 11/2005 | Harik |

FOREIGN PATENT DOCUMENTS

| US | 2002/0156799 A1 | 10/2002 |
| US | 2004/0148568 A1 | 7/2004 |

OTHER PUBLICATIONS

Bronstad et al., U.S. Appl. No. 11/362,988, YOR920050416US2, Notice of Allowance, Jan. 13, 2010, 3 pages.

(Continued)

*Primary Examiner* — Jeffrey A Gaffin
*Assistant Examiner* — Mai T Tran
(74) *Attorney, Agent, or Firm* — Gibb I.P. Law Firm, LLC; Derek S. Jennings

(57) ABSTRACT

Embodiments herein provide a method, computer program product, etc. of measuring a large population of web pages for compliance to content standards that require human judgment to evaluate. The method performs an automated analysis of a web space, comprising gathering information about structure and content of the web space. The performing of the automated analysis further comprises creating first data and second data. Specifically, the creating of the first data comprises creating page-relationship data based on a directory tree structure of servers in the web space or link distances amongst pages in the web space. The creating of the second data comprises analyzing web page content, comprising creating compliance-indicating data and/or content structure data for pages in the web space. In addition, the performing of the automated analysis can comprise performing the automated analysis on a web space that lacks objective standards violations that can be identified using software.

25 Claims, 6 Drawing Sheets

OTHER PUBLICATIONS

Bronstad et al. U.S. Appl. No. 11/362,988, YOR920050416US2, Office Action Communication, Jul. 31, 2009, 13 pages.

Bronstad et al., U.S. Appl. No. 11/362,988, YOR920050416US2, Office Action Communication, 13 pages, Apr. 30, 2008.

Bronstad et al., U.S. Appl. No. 11/362,988, YOR920050416US2, Office Action Communication, 15 pages, Oct. 14, 2008.

Bronstad et al., U.S. Appl. No. 11/362,988, YOR920050416US2, Office Action Communication, 11 pages, Feb. 19, 2009.

Bronstad et al., U.S. Appl. No. 11/362,988, YOR920050416US2, Notice of Allowance, 4 pages, Oct. 16, 2009.

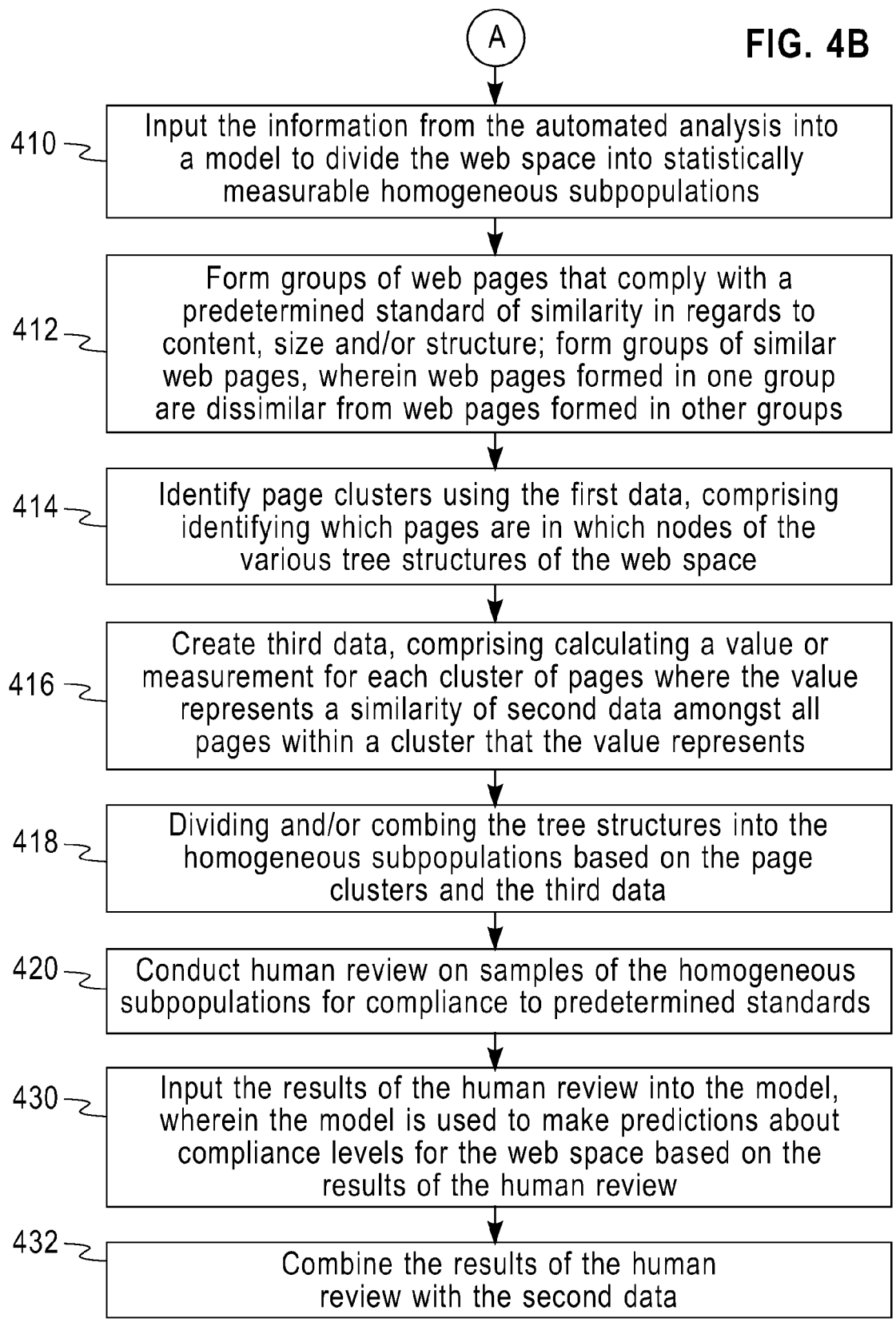

METHOD OF MEASURING A LARGE POPULATION OF WEB PAGES FOR COMPLIANCE TO CONTENT STANDARDS THAT REQUIRE HUMAN JUDGEMENT TO EVALUATE

CROSS-REFERENCE TO RELATED APPLICATIONS

This application is a Continuation of U.S. Pat. No. 7,725,407, Issued on May 25, 2010, which claims the benefit of U.S. Provisional Patent Application No. 60/707,434 filed on Aug. 11, 2005, the contents of which in their entireties are herein incorporated by reference.

BACKGROUND

1. Field of the Invention

Embodiments of the invention provide a method, computer program product, etc. of measuring a large population of web pages for compliance to content standards that require human judgment to evaluate.

2. Description of the Related Art

There is a need for a method for measuring the level of compliance to a set of web standards that require human judgment to evaluate for a large number of web pages. In this case, large means any number for which human review of the entire population is impractical where the population is normally heterogeneous in nature. For example, this would include the web domains of most large companies, government agencies, or universities. In most web domains, there is not enough homogeneity in structure or content of web pages to randomly sample a reasonable number of pages for review and state the level of compliance with a computable confidence level.

SUMMARY

Embodiments of the invention provide a method, computer program product, etc. of measuring a large population of web pages for compliance to content standards that require human judgment to evaluate. The method performs an automated analysis of a web space, comprising gathering information about structure and content of the web space. The performing of the automated analysis further comprises creating first data and second data. Specifically, the creating of the first data comprises creating page-relationship data based on a directory tree structure of servers in the web space or link distances amongst pages in the web space. The first data thus defines both which pages are neighbors within nodes of a web tree structure and which nodes are neighbors within the tree structure. Nodes may also be referred to as page clusters. The creating of the second data comprises analyzing web page content, comprising creating compliance-indicating data and/or content structure data for pages in the web space. In addition, the performing of the automated analysis can comprise performing the automated analysis on a web space that MAY OR may not contain objective standards violations (i.e., violations that can be definitively identified using only software).

Next, the method inputs the information from the automated analysis into a model. The model is used to divide the web space into homogeneous subpopulations, wherein each subpopulation consists of all the pages in a group of one or more neighboring page clusters and the web pages in the subpopulation collectively comply with a predetermined standard of similarity regards to content, size and/or structure. That is, the model is used to form groups of similar web pages, wherein web pages formed in one group are dissimilar from web pages formed in other groups.

More specifically, the dividing of the web space comprises using first data to identify clusters of pages (nodes in the tree), creating third data, and dividing and/or combining the tree structures into the homogeneous groups, subpopulations, based on the page clusters and the third data. The creating of the third data comprises measuring pair-wise similarities of the second data amongst the pages in a cluster and calculating a value, e.g., a mean, that represents the similarity of pages in that cluster. Furthermore, the creating of the groups of neighboring page clusters (subpopulations) comprises measuring pair-wise similarities of neighboring nodes in various tree structures of the web space using the first and third data.

Following this, the method conducts human review on samples of the homogeneous subpopulations for compliance to predetermined standards. The results of the human review are subsequently input into the model, wherein the model is used to make predictions about compliance levels for the web space based on the results of the human review. Specifically, the making of the predictions comprises combining the results of the human review with the second data.

Accordingly, embodiments herein perform an automated analysis of a web space to gather information about its structure and content. The information from the automated analysis is then used as input to a statistical model that divides the web space into measurably homogenous subpopulations. Next, human review is conducted on samples of the subpopulations. Using the review results as input to the web space model, predictions are subsequently made about the compliance level for the whole population.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIGS. 4(A)-4(B) is a flow diagram illustrating a method of measuring a large population of web pages for compliance to content standards that require human judgment to evaluate.

DETAILED DESCRIPTION OF PREFERRED EMBODIMENTS

Figure 1:
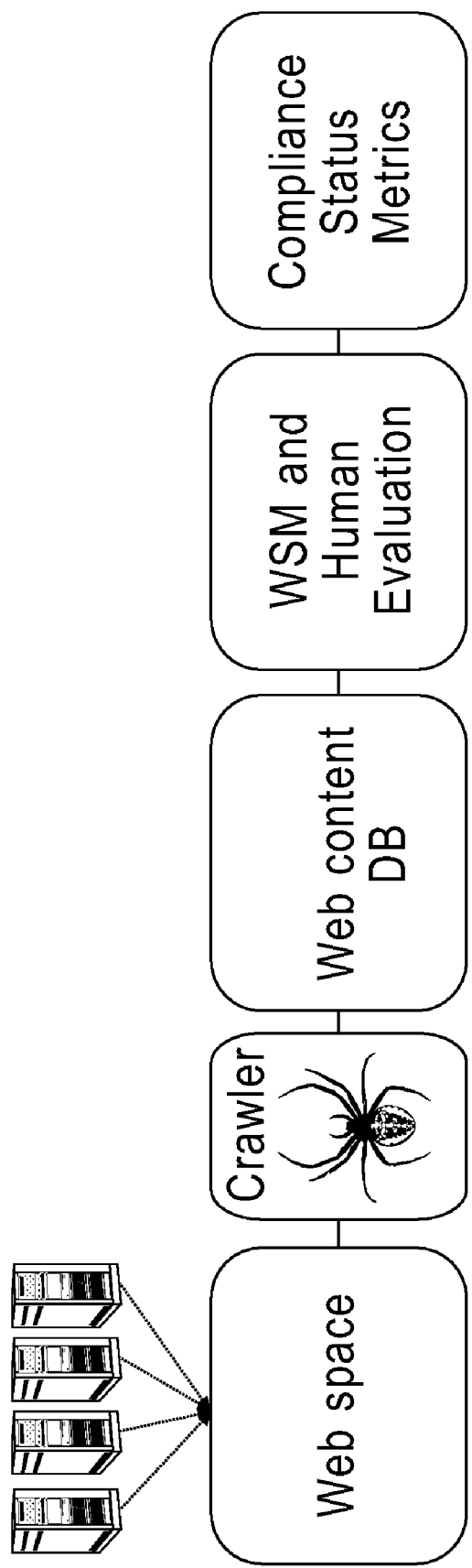
FIG. 1 is a diagram illustrating a method of measuring a large population of web pages for compliance to content standards that require human judgment to evaluate.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Embodiments herein perform an automated analysis of a web space to gather information about its structure and content. The information from the automated analysis is then used as input to a statistical model that divides the web space into measurably homogenous subpopulations. Next, human review is conducted on samples of the subpopulations. Using the review results as input to the web space model, predictions are subsequently made about the compliance level for the whole population.

Given that a web space is to be measure for compliance, the first step is to identify and analyze every web page in that space using automated analysis tools. This step can be implemented with a collection of various software packages that include a web crawler, a page analyzer, and an internal web page ownership identifier. The results of this analysis contain three types of data. Type one (also referred to herein as "first data") is page-relationship data. This is typically based on the directory tree structure of the servers included in the web space. It could also be based on link distances. Type two (also referred to herein as "second data") is standards-related data that is relevant to the standards being reviewed for every page in the web space. For example, if the standards for which compliance measurement is desired are accessibility standards, this data will include counts of the number of graphics, number of form elements, number of data tables, number of multi-media elements, number of machine-detectable accessibility errors, etc. Type three (also referred to herein as "third data") is other data that serves as indicators of homogeneity of structure or content.

The algorithms of the web space model are implemented in a program called the web space modeler (WSM). One set of algorithms uses all three types of data described above to divide the web space into subpopulations that are statistically homogeneous to the extent required for the desired confidence level in the resulting compliance measurements. This algorithm set uses the type one data to walk the various tree structures of the web space and measures the pair-wise similarities of types two and three data amongst pages, dividing (or combining) the trees into subpopulations based on degree of similarity.

The WSM then collects sample pages from each subpopulation that is input into the human review process. The human review process involves a person evaluating each sample page for compliance to the appropriate standards. The evaluation results are fed to the WSM, which then combines the human review data with the type two data and makes predictions about the total compliance.

Embodiments of the invention provide a method for measuring the compliance of large web domains, or collections of domains, to web content standards that require human judgment. Embodiments herein describe subjective standards and objective standards.

Subjective standards describe a web content standard that uses human judgment to implement and evaluate. Examples of such standards include accessibility standards that require alt text on images to be appropriate, text labels on form elements to be sufficiently descriptive, and titles on frames to be adequately descriptive of the frame's contents. An enterprise may also have other types of content standards that involve human judgment to implement and evaluate that are specific to the enterprise.

Objective standards describe a web content standard, or portion of a standard, that can be programmatically evaluated. That is, software can be written to determine if the standard has been met. An example is the accessibility standard that prohibits the use of server side image maps or prohibits anchor tags that include an IMG attribute and omit an anchor tag text value from also omitting the alt attribute.

There is a need for a method for measuring the level of compliance of a large web domain to subjective standards. In this case, large means any number for which human review of the entire population is relatively impractical and where the distribution of standards violations within the population is heterogeneous. This would include the web domains of most large companies, government agencies, or universities.

If a web domain was known to be largely homogenous in content and page structure, something that is only likely to be possible if the content is all machine generated, then there is a solution: randomly select some pages to manually evaluate and assume the sample is representative of the whole population. It would be difficult to find real-world web sites where such a strategy would be valid, however, because typically there is large variation in page content and structure across any large web space. Some variation is by design, resulting from the diverse needs of various applications that are included in the domain. Some of the variation is due to size, e.g., variations in management systems and personnel, variations in content production techniques, data sources, content types, etc.

The statistically guided human review process is a method for calculating a statistically valid measurement of the compliance of a large web domain to subjective standards. Embodiments herein comprise four general steps: first, perform an automated analysis of the web space to gather information about its structure and content. Second, use the information from the automated analysis as input to a statistical model that divides the web space into statistically homogenous subpopulations. Third, conduct human review on samples of the subpopulations. Fourth, use the review results as input to the statistical model and make predictions about the compliance level for the whole population.

One aspect of embodiments of the invention is that it can be applied to populations of web pages that have a zero rate of objective standards violations. Most categories of standards that include subjective criteria, e.g., accessibility standards, also include objective criteria that can be programmatically evaluated. The particular aspects of these methods make it possible to predict subjective compliance levels on a fully objectively compliant population. This capability is based on the design of the statistical model that is integrated into the above process.

Violations of standards have been shown to cluster on groups of related pages (see P. Bronstad and J. Slatin, "Using Web Site Interconnectivity To Find Clusters Of Accessibility Problems," Technology and Persons with Disabilities Conference 2004, Conference Proceedings, http://www.csun.edu/cod/conf/2004/proceedings/147.htm). This can happen because those clusters may be managed by a particular group or individual, be created with the same tool, have similar content or other common elements, are changed at similar frequencies, or other such factors. This has led to the observation that pages that are related and demonstrably similar have statistically equivalent levels of violations of standards.

This observation is the basis for two components of the statistical web space model employed by this measurement methodology: the determination of page relationships and the measures of page similarity. There are several potential methods for grouping and relating pages. To explain embodiments of the invention, the first, simplest, and most widely applicable implementation of relationship determination is used: page groups and relationships are derived from the directory structures of the servers that host them. Page similarity is based on a characterization that is done on 100% of the population by software.

This 100% characterization is an aspect of the workability of embodiments of the invention. Features of this characterization include: first, because the characterization is automated, it allows every page in the total population to be characterized even though the population may consist of millions of pages. Characterizing 100% of the population allows prediction algorithms to be more accurate.

Second, the characterization includes measurements of traits that are indicators of opportunity for standards violations but the traits themselves are not violations. Thus, every page in the population has a non-zero characterization. Examples of traits used in an accessibility characterization are the number of active graphics, the number of small, static graphics, the number of large, static graphics, the number of input elements, etc. This method of characterization allows the methodology to be utilized on populations that are 100% compliant with objective standards. Third, the characterization can have any number of dimensions, i.e., can be based on any number of measurements of each web page.

Embodiments of the invention are integrated into an end-to-end process depicted in FIG. 1. First, the process starts with a web space that may be known to be essentially compliant with all objective standards. Next, the spider or crawler crawls the web space to retrieve html content. The data the crawler finds is then stored in a web content database. The web content is subsequently used as input to the web space modeler (WSM-software that implements the model) that will guide human review of a collection of samples of content. Typically, this end-to-end process is used to measure objective compliance and this step consists of software that analyzes web content for compliance to objective standards. Embodiments of the invention accurately include subjective standards review in this part of the process. This methodology is broken down in the two following figures.

Following this, the output from the human review process and statistical model is compliance status metrics for subjective standards. These metrics are delivered with a statistically valid confidence level. The confidence level is controllable by adjusting input parameters, e.g., the number of pages which can be reviewed by the available human review resources.

Figure 2:
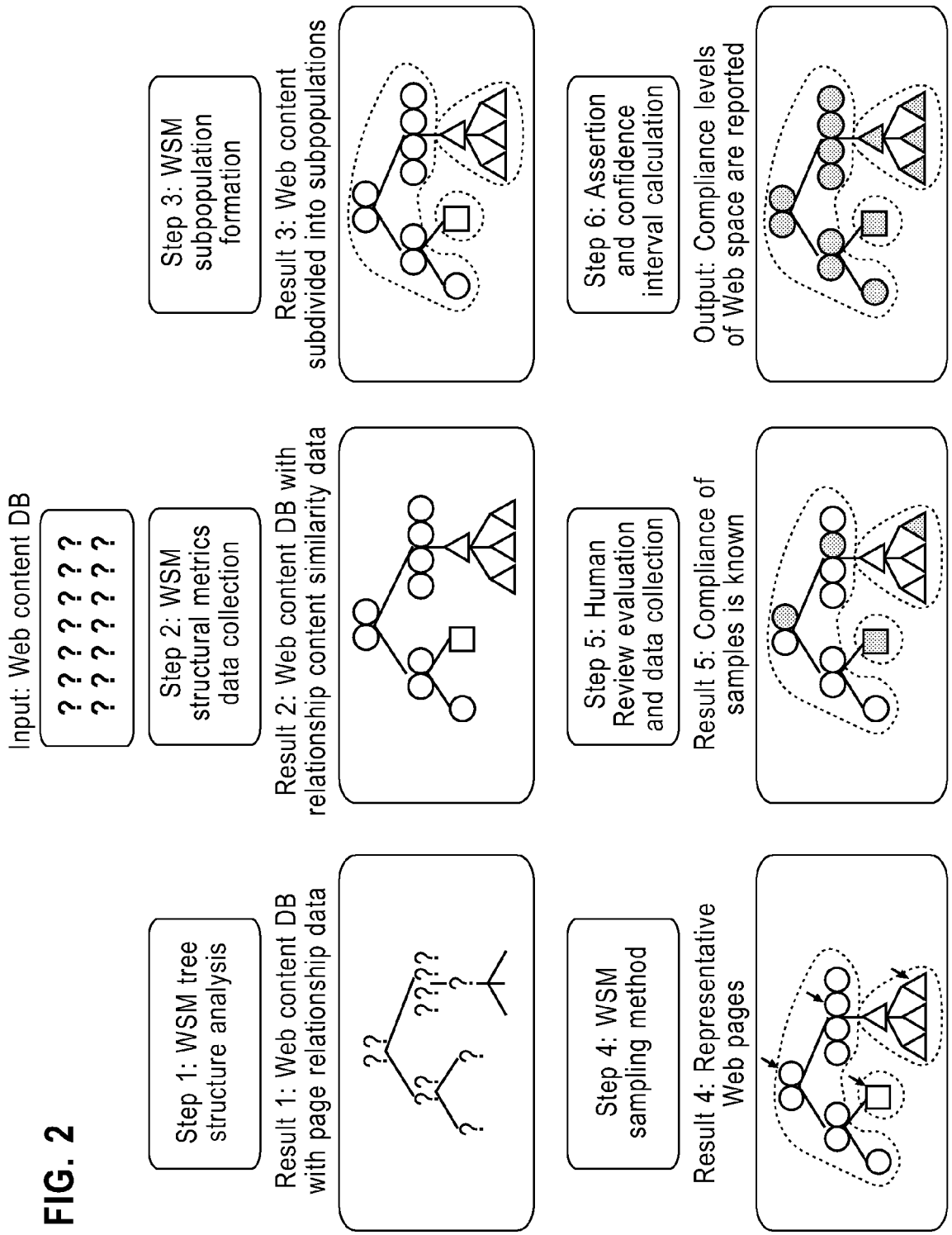
FIG. 2 is a diagram illustrating the WSM and Human Evaluation step of FIG. 1.

Referring to FIG. 2, a break down of the WSM and human review component of the end-to-end process is shown. The input is the web content database. The pages are represented by question marks signifying that there is nothing known about them. In step 1, the WSM executes a page-relationship analysis on the pages in the database. The result of step 1 is that the relationships amongst pages in the web content database are known, as shown by the hierarchical relations amongst pages in FIG. 2. The pages are grouped into folders, or directories, that are related in a tree structure.

In step 2, the WSM collects data that allows the pages to be characterized as similar or dissimilar, irrespective of their relationship in the directory structure. The type of data that is collected can be tailored to the web space if required. In the result of step 2, the pages are now represented by open squares, triangles, and circles, rather than question marks, signifying that they have a known character; data is known on each. In FIG. 2, they are portrayed with an unfilled shape to signify that their compliance to standards is still not known. A real web space could have any number of "shapes" or "characterizations".

In step 3, the WSM starts at the root of each relationship tree, calculates the mean pair-wise similarity of the pages in each folder (this calculation is described below), and gathers similar folders into subpopulations. The parameter that determines how close the mean similarity of two folders must be in order for a candidate folder to be assumed by a subpopulation is called theta. Theta can be adjusted to accommodate the amount of resource available for human review. This will affect the confidence level given to the end result because the number of pages sampled is inversely related to the size of the confidence level. In result 3, the dotted lines surrounding similar shapes represent the subpopulations.

In step 4, the WSM selects pages from each population to be included in the sample of that population. The sample size is calculated dynamically. There are a few choices for sampling methods, one of which is random. In result 4, the pages included in the sample are marked with arrows.

In step 5, the sample pages are reviewed by human reviewers who evaluate the compliance levels of the pages. The result is a compliance metric for each page in the sample. This metric can be a single number (representing a rating like good, fair, poor) or an array of numbers (like a count of violations for each standard), depending on the amount of resource available and how a customer wants to use the results. In result 5, FIG. 2 shows that the objects representing the sample pages are now shaded, meaning that their compliance is known.

In step 6, the WSM uses the results of the human review to assert the compliance levels of the subpopulations and the whole web space and calculates the confidence intervals for the assertions. In the output, all pages are shaded meaning their compliance levels are known or estimated.

Figure 3:
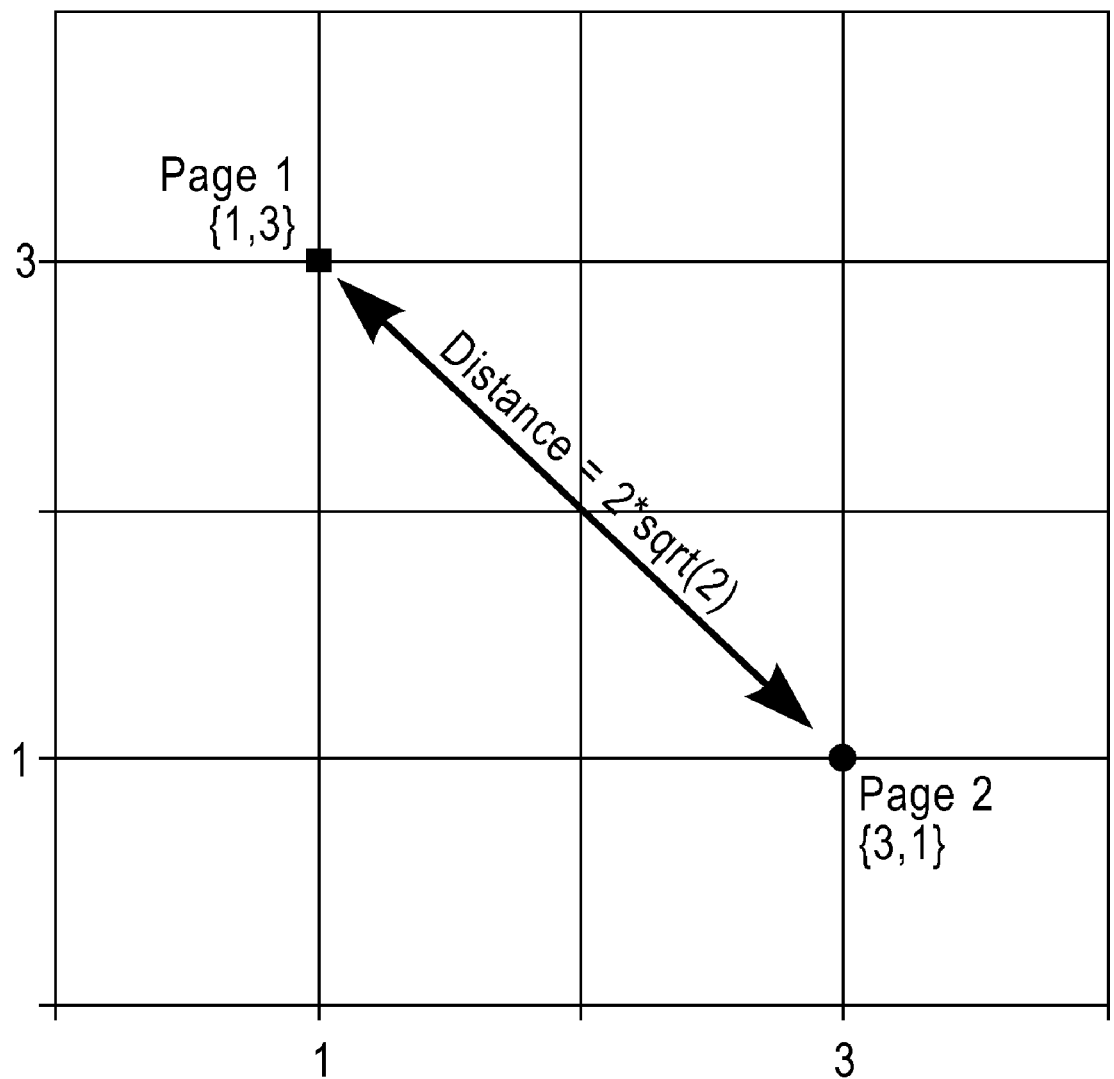
FIG. 3 is a diagram illustrating a Euclidean distance metric.

One of the three methods being used for measuring pair-wise similarity is the Euclidean distance metric that is depicted in FIG. 3. To simplify depiction, FIG. 3 assumes only two features are gathered during automated analysis for each Web page: for example, the number of large, static graphics and the number of small, static graphics. In practice, two dimensions may be insufficient, so the algorithm operates in n dimensions. If two web pages have equivalent measurements in all dimensions, the distance between the ends of the vectors that describe their character is 0. If two pages are very different, the distance will be relatively large. It is also possible to tune the model's characterization by weighting dimensions by multiplying that dimension by a weighting factor before calculating the distances. Weights can be found by training a neural network to discriminate among populations of pages.

For the example web space shown in FIG. 2, the pair-wise similarities of every pair of pages in a folder are calculated. The average of the feature values, from automated analysis, for all the pages in a folder gives the mean structural description for that folder. In this example, the smallest possible subpopulation is a single folder. The subpopulation formation first focuses on the root folder. It will then assume a neighboring folder if the similarity of the root folder's mean structural description to the neighboring folder's mean structural description are no greater than theta.

As described above, the WSM algorithms have a number of parameters and method choices that need to be made to determine what the most effective inputs will be and that can be used to tune it to a particular web space or set of customer preferences. There are two general methods for making these parameter selections and determining their values.

First, several web space segments that have nonzero objective compliance can be used as test populations. The method can be used to predict the objective compliance and the predictions can be compared to the actual values.

Second, some small populations can be subjected to nearly 100% human review and the method can be used to predict the subjective compliance for the populations and the predictions can be compared to the actual values.

In practice, both tuning approaches are expected to be valid in most implementations since there are few very large web spaces that do not have pockets of nonzero objective compliance. In addition, the abilities to expand the realm of objective compliance are continuously improved by strengthening the capabilities of compliance analysis engines. This improves the probability that there will be more objectively noncompliant pages available.

Accordingly, embodiments of the invention provide a method, computer program product, etc. of measuring a large population of web pages for compliance to content standards that require human judgment to evaluate. The method performs an automated analysis of a web space, comprising gathering information about structure and content of the web space. The performing of the automated analysis can comprise performing the automated analysis on a web space that lacks objective standards violations that can be identified using software (i.e., without human intervention). An example of an objective standard is the accessibility standard that prohibits the use of server side image maps or prohibits anchor tags that include an IMG attribute and omit an anchor tag text value from also omitting the alt attribute.

In addition, the performing of the automated analysis comprises creating first data and second data. Specifically, the creating of the first data comprises creating page-relationship data based on a directory tree structure of servers in the web space or link distances amongst pages in the web space and attributes of the web space that create similarly managed or similarly developed groups of pages. The creating of the second data comprises analyzing web page content, comprising creating compliance-indicating data and/or content structure data for pages in the web space. For example, if the standards for which compliance measurement is desired are accessibility standards, the second data will include counts of the number of graphics, number of form elements, number of data tables, number of multi-media elements, number of machine-detectable accessibility errors, etc.

Next, the method inputs the information from the automated analysis into a model (i.e., the WSM). The model is used to divide the web space into statistically measurable homogeneous subpopulations, wherein the subpopulations consist of all pages in one or more neighboring page clusters and all web pages within a subpopulation comply with a predetermined standard of similarity in regards to content, size and/or structure. That is, the model is used to form groups of similar web pages, wherein web pages formed in one group are dissimilar from web pages formed in other groups.

More specifically, the dividing of the web space comprises using first data to identify page clusters, creating third data, and dividing and/or combining the tree structures (i.e., the clusters) into the homogeneous subpopulations based on the page clusters and the third data. The identifying of the page clusters comprises identifying which pages are in which nodes of the various tree structures of the web space. In other words, it comprises identifying nodes of various tree structures of the web space or groups of similarly managed or similarly developed pages and identifying which pages belong to each node or groups. The creating of the third data comprises measuring pair-wise similarities of the second data amongst the pages in each cluster and calculating a value, e.g., a mean, that represents the similarity of pages in that cluster. In other words, it comprises calculating a value or measurement for each cluster of pages in the web space (i.e., each node of the web space) where the value represents a similarity of second data amongst all pages within a cluster (i.e., a node) that the value represents.

For example, if it were determined that the indicating traits for compliance to a given set of standards for a particular web space included the number of photographs on a page, the size of the page in kilobytes, the number of links on the page, and the age of the page, values for each of those traits for each page would be the second data. Further suppose it was determined that position in the server's directory tree was the best clustering method for pages in this web space and that the example web space contains 100 directories on a single server. In this case, the first data identifies which pages are within each directory and where the directories fall within the directory tree. Third data is created by calculating the pair-wise similarity of all the pages in each directory using the second data and calculating a number for each directory, cluster, that represents the overall similarity of pages within the directory. Starting with the root directory, the third data is then compared for neighboring directories to determine if the pages in the neighboring directories are sufficiently similar to group the neighboring directories together in a subpopulation. The numeric threshold that is used for a similarity cut-off is called theta. Small theta, a low cut-off, will create more subpopulations as it will require more similarity. In this example, a first group of web pages could include 20 neighboring directories, clusters, of pages where in the typical page has more than 3 photographs, is more than 1000 kilobytes in size, has fewer than 10 links, and is less than one year old. A second group of pages may consist of a group of 30 neighboring clusters wherein the typical page has three or fewer photographs, is smaller than 1000 kilobytes, has more than 10 links, and is more than a year old. A third group may consist of 50 neighboring clusters wherein the typical page has 3 or fewer photographs, is less than 1000 kilobytes in size, has 20 or more links, and is less than 3 months old. Had theta been smaller, there may have been more than three groups and the differences in typical traits would be less dramatic. For example, the third group may have been split into two groups where one group typically has pages less than 1 month old and the second group has pages less than 3 months old.

As described above, because the grouping/characterization is automated, it allows every page in the total population to be characterized even though the population may consist of millions of pages. Characterizing 100% of the population allows prediction algorithms to be more accurate. Further, the characterization includes measurements of traits that are indicators of opportunity for standards violations but the traits themselves are not violations. Thus, every page in the population has a non-zero characterization. Examples of traits used in an accessibility characterization are the number of active graphics, the number of small, static graphics, the number of large, static graphics, the number of input elements, etc. This method of characterization allows the methodology to be utilized on populations that are 100% compliant with objective standards. Moreover, the characterization can have any number of dimensions, i.e., can be based on any number of measurements of each web page.

Following the dividing of the web space, the method conducts human review on samples of the homogeneous subpopulations for compliance to predetermined standards. As described above, the result of the human review is a compliance metric for each page in the sample. This metric can be a single number (representing a rating like good, fair, poor) or an array of numbers (like a count of violations for each standard), depending on the amount of resource available and how a customer wants to use the results.

The results of the human review are subsequently input into the model, wherein the model is used to make predictions about compliance levels for the web space based on the results of the human review. Specifically, the making of the predictions comprises combining the results of the human review with the second data. As described above, the WSM uses the results of the human review to assert the compliance levels of the subpopulations and the whole web space and calculates the confidence intervals for the assertions.

Figure 4A:
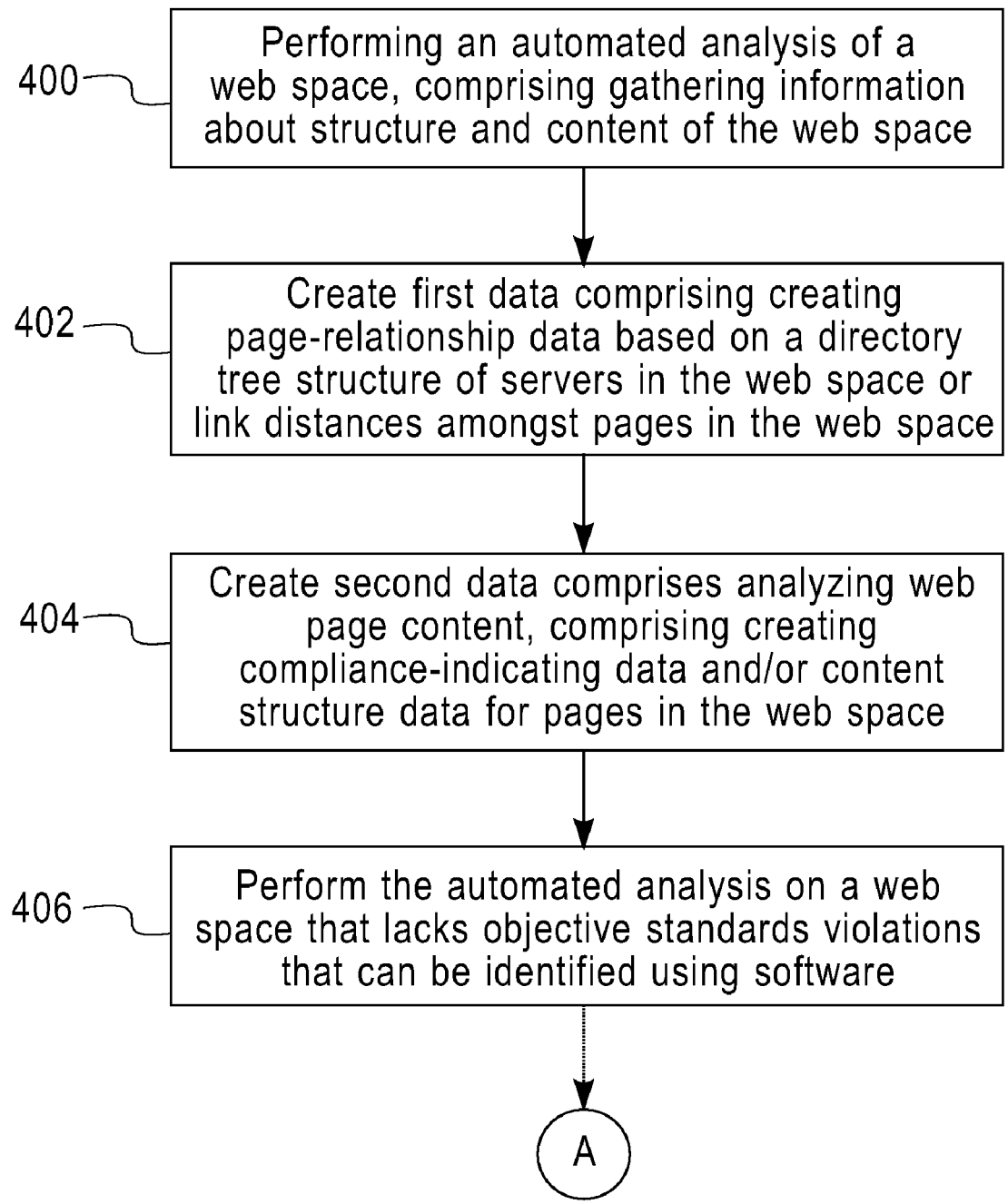

FIGS. 4(A) and 4(B) illustrate a flow diagram for a method of measuring a large population of web pages for compliance to content standards that require human judgment to evaluate. In item 400, the method begins by performing an automated analysis of a web space, comprising gathering information about structure and content of the web space. More specifically, this step involves creating first data, comprising creating page-relationship data based on a directory tree structure of servers in the web space or link distances amongst pages in the web space (item 402). Furthermore, second data is created, comprising analyzing web page content, comprising creating compliance-indicating data and/or content structure data for pages in the web space (item 404). For example, if the standards for which compliance measurement is desired are accessibility standards, this data will include counts of the number of graphics, number of form elements, number of data tables, number of multi-media elements, number of machine-detectable accessibility errors, etc.

The performing of the automated analysis can also comprise performing the automated analysis on a web space that lacks objective standards violations that can be identified using software (item 406). An example of an objective standard is the accessibility standard that prohibits the use of server side image maps or prohibits anchor tags that include an IMG attribute and omit an anchor tag text value from also omitting the alt attribute.

Next, in item 410, the information from the automated analysis is input into a model to divide the web space into statistically measurable homogeneous subpopulations, wherein all web pages within a subpopulation comply with a predetermined standard of similarity in regards to content, size and/or structure; forming groups of similar web pages, wherein web pages formed in one group are dissimilar from web pages formed in other (i.e., neighboring) groups (item 412). For example, a first group of web pages could include web pages that typically have more than 3 photographs and are more than 6 months old and a second group of web pages could include web pages with 3 or fewer photographs and are less than 12 months old.

The dividing of the web space further comprises identifying page clusters using the first data, that is, identifying which pages are in which nodes of the various tree structures of the web space (item 414). In addition, third data is created, comprising calculating a value or measurement for each cluster of pages where the value represents a similarity of second data amongst all pages within a cluster that the value represents (item 416). Moreover, the method divides and/or combines the tree structures into the homogeneous subpopulations based on the page clusters and the third data (item 418).

As described above, because the grouping/characterization is automated, it allows every page in the total population to be characterized even though the population may consist of millions of pages. Characterizing 100% of the population allows prediction algorithms to be more accurate. Further, the characterization includes measurements of traits that are indicators of opportunity for standards violations but the traits themselves are not violations. Thus, every page in the population has a non-zero characterization. Examples of traits used in an accessibility characterization are the number of active graphics, the number of small, static graphics, the number of large, static graphics, the number of input elements, etc. This method of characterization allows the methodology to be utilized on populations that are 100% compliant with objective standards. Moreover, the characterization can have any number of dimensions, i.e., can be based on any number of measurements of each web page.

Following the dividing of the web space, in item 420, human review is conducted on samples of the homogeneous subpopulations for compliance to predetermined standards. As described above, the result of the human review is a compliance metric for each page in the sample. This metric can be a single number (representing a rating like good, fair, poor) or an array of numbers (like a count of violations for each standard), depending on the amount of resource available and how a customer wants to use the results.

Subsequently, in item 430, the results of the human review are input into the model, wherein the model is used to make predictions about compliance levels for the web space based on the results of the human review. This step further comprises combining the results of the human review with the second data (item 432). As described above, the WSM uses the results of the human review to assert the compliance levels of the subpopulations and the whole web space and calculates the confidence intervals for the assertions.

Embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
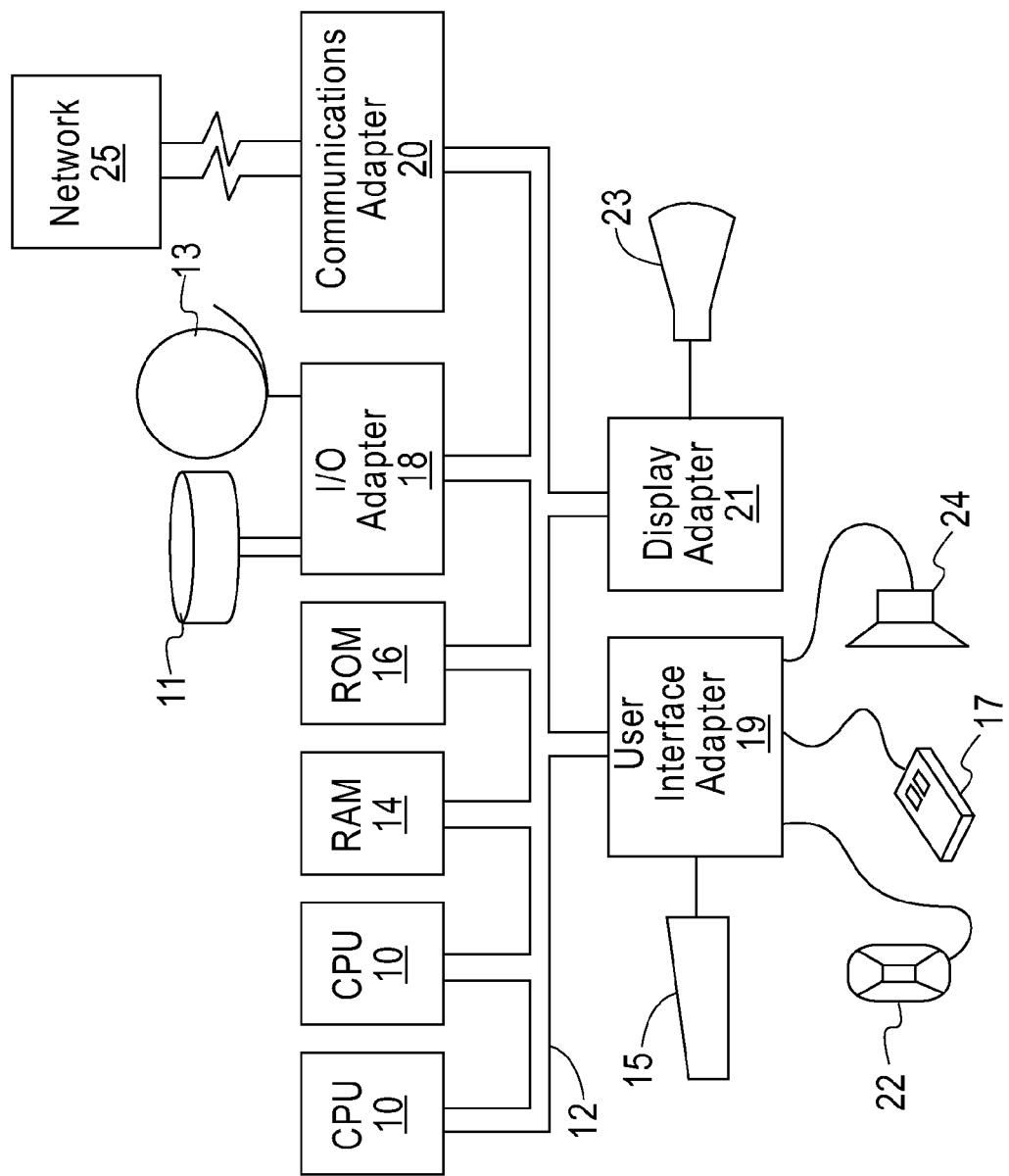
FIG. 5 is a diagram illustrating a computer program product for measuring a large population of web pages for compliance to content standards that require human judgment to evaluate.

A representative hardware environment for practicing the embodiments of the invention is depicted in FIG. 5. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, embodiments herein perform an automated analysis of a web space to gather information about its structure and content. The information from the automated analysis is then used as input to a statistical model that divides the web space into measurably homogenous subpopulations. Next, human review is conducted on samples of the subpopulations. Using the review results as input to the web space model, predictions are subsequently made about the compliance level for the whole population.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer-implemented method, comprising:
   performing, by a computer, an automated analysis of a web space, comprising gathering information about structure and content of said web space;
   inputting, to said computer, said information from said automated analysis into a model;
   dividing, by said computer, said web space into statistically measurable homogeneous subpopulations using said model;
   conducting human review on samples of said homogeneous subpopulations for compliance to predetermined standards;
   inputting, to said computer, results of said human review into said model; and
   making, by a computer, predictions about compliance levels for said web space based on said results of said human review using said model.

2. The method according to claim 1, said performing of said automated analysis further comprising, creating first data and second data.

3. The method according to claim 2, said creating of said first data comprising, creating page-relationship data based on at least one of a directory tree structure of servers in said web space and link distances amongst pages in said web space.

4. The method according to claim 2, said creating of said second data comprising, analyzing web page content, comprising creating at least one of compliance-indicating data and content structure data for pages in said web space.

5. The method according to claim 2, said dividing of said web space comprising:
   using said first data to identify page clusters, comprising identifying which pages are in which nodes of the various tree structures of said web space;
   creating third data, comprising calculating a value for each said cluster of pages, said value representing a similarity of second data amongst all pages within a cluster that said value represents; and
   one of dividing and combining said tree structures into said homogeneous subpopulations based on said page clusters and said third data.

6. The method according to claim 2, said making of said predictions comprising, combining said results of said human review with said second data.

7. The method according to claim 1, said performing of said automated analysis comprising, performing said automated analysis on said web space that lacks objective standards violations that are identified using software.

8. A computer-implemented method, comprising:
   performing, by a computer, an automated analysis of a web space, comprising gathering information about structure and content of said web space;
   inputting, to said computer, said information from said automated analysis into a model;
   dividing, by said computer, said web space into homogeneous subpopulations using said model, said web pages within a homogeneous subpopulation complying with a predetermined standard of similarity in regards to at least one of content and structure;
   conducting human review on samples of said homogeneous subpopulations for compliance to predetermined standards;
   inputting, to said computer, results of said human review into said model; and
   making, by said computer, predictions about compliance levels for said web space based on said results of said human review using said model.

9. The method according to claim 8, said performing of said automated analysis further comprising, creating first data and second data.

10. The method according to claim 9, said creating of said first data comprising, creating page-relationship data based on at least one of a directory tree structure of servers in said web space and link distances amongst pages in said web space.

11. The method according to claim 9, said creating of said second data comprising, analyzing web page content, comprising creating at least one of compliance-indicating data and content structure data for pages in said web space.

12. The method according to claim 9, said dividing of said web space comprising:
   using said first data to identify page clusters, comprising identifying nodes of various tree structures of said web space and identifying which pages belong to each said node;
   creating third data, comprising calculating a value or measurement for each said node of said web space that represents a similarity of said second data of all said pages within a node that said value represents; and
   one of dividing and combining said tree structures into said homogeneous subpopulations based on said page clusters and said third data.

13. The method according to claim 9, said making of said predictions comprising, combining said results of said human review with said second data.

14. The method according to claim 8, said performing of said automated analysis comprising, performing said automated analysis on said web space that lacks objective standards violations that can be identified without human intervention.

15. A computer-implemented method, comprising:
   performing, by a computer, an automated analysis of a web space, comprising gathering information about structure and content of said web space;
   inputting, to said computer, said information from said automated analysis into a model;
   dividing, by said computer, said web space into homogeneous subpopulations using said model, comprising forming groups of similar web pages, said web pages being formed in one group being dissimilar from web pages formed in other groups;
   conducting human review on samples of said homogeneous subpopulations for compliance to predetermined standards;
   inputting, to said computer, results of said human review into said model; and
   making, by said computer, predictions about compliance levels for said web space based on said results of said human review using said model.

16. The method according to claim 15, said performing of said automated analysis further comprising, creating first data and second data.

17. The method according to claim 16, said creating of said first data comprising, creating page-relationship data based on at least one of a directory tree structure of servers in said web space and link distances amongst pages in said web space and attributes of said web space that create managed groups of pages.

18. The method according to claim 16, said creating of said second data comprising, analyzing web page content, comprising creating at least one of compliance-indicating data and content structure data for pages in said web space.

19. The method according to claim 16, said dividing of said web space comprising:
   using said first data to identify page clusters, comprising identifying nodes of various tree structures or groups of managed pages, and which pages belong to said nodes or said groups;
   creating third data, comprising calculating a value for each said cluster in said web space such that said value represents the similarity of said second data amongst all said pages within a cluster that said value represents; and
   one of dividing and combining said clusters into said homogeneous subpopulations based on said third data.

20. The method according to claim 16, said performing of said automated analysis comprising, performing said automated analysis on said web space that lacks objective standards violations that can be identified without human intervention.

21. The method according to claim 16, said making of said predictions comprising, combining said results of said human review with said second data.

22. A non-transitory computer program storage device, readable by a computer, said computer program, when executed on said computer, causing said computer to perform a method, comprising:
   performing an automated analysis of a web space, comprising gathering information about structure and content of said web space;
   inputting said information from said automated analysis into a model;
   dividing said web space into homogeneous subpopulations using said model;
   conducting human review on samples of said homogeneous subpopulations for compliance to predetermined standards;
   inputting results of said human review into said model; and
   making predictions about compliance levels for said web space based on said results of said human review using said model.

23. The non-transitory computer program storage device according to claim 22, said performing of said automated analysis comprising, performing said automated analysis on said web space that lacks objective standards violations that can be analyzed using software.

24. The non-transitory computer program storage device according to claim 22, said dividing of said web space further comprising, forming groups of web pages that comply with a predetermined standard of similarity in regards to at least one of content and structure.

25. The non-transitory computer program storage device according to claim 22, said dividing of said web space further comprising, forming groups of similar web pages, said web pages being formed in one group being dissimilar from web pages formed in other groups.

* * * * *